Patented Dec. 22, 1931

1,838,036

UNITED STATES PATENT OFFICE

ALBERT C. FISCHER, OF CHICAGO, ILLINOIS, ASSIGNOR, BY MESNE ASSIGNMENTS, TO THE PHILIP CAREY MANUFACTURING COMPANY, A CORPORATION OF OHIO

EXPANSION JOINT WITH UNSATURATED FILLER

No Drawing.  Application filed November 2, 1925.  Serial No. 66,386.

The subject-matter of this invention is a packing joint for sections of paving, buildings, or other structures, which is composed of a waterproofing substance, such, for instance, as asphalt or other bituminous material, having incorporated therein, a quantity sufficient to lighten the weight of the mass and give it the inherent qualities of compressibility and resiliency under varying degrees of pressure imposed upon it in service, a filling material, such, for instance, as shredded or otherwise subdivided wood or other fibrous or organic material protected against impregnation by the waterproofing material, particularly when the latter is in the state of fusion incident to the incorporation of the filling material or the pouring of the mass into a mold or other defined space, or even into the space between the sections of structure in the formation of the waterproof joint.

This application is a continuation in part of my application Serial No. 700,734, filed March 20, 1924, for waterproof expansion joints, in which is described and broadly claimed a packing material composed of a waterproofing enveloping substance and a filling material having inherent compressibility and resiliency and enveloped by said waterproofing material; and which also teaches the idea of treating the filling material in a manner to maintain inherent compressibility and resiliency of the filling material through that stage of the process during which, for the sake of thoroughly incorporating it in the waterproofing substance, the latter has to be heated to a state of such relatively high fluidity as would render the normally porous and absorbent filling material liable to saturation to a degree which would destroy its inherent qualities relied upon; any one of several treatments of the filling material for the purpose stated being relied on, for instance, coating the filling material with a substance, such as sodium silicate, which is insoluble in the hot waterproofing material and therefore constitutes an envelope that excludes the latter from the filling material; or subjecting the filling material, prior to incorporation with the waterproofing material, to impregnation with a medium, for instance, water, which, while sufficiently filling the pores or interstices of the filling material to exclude the waterproofing material while the latter is in fluid state, will volatilize under the heat of the mixing process and evacuate the pores or interstices so as to leave the filling material in the physical condition desired after the mixture has cooled; or mixing the filling material in an emulsion or colloidal mixture of waterproofing material and water under circumstances which result in the filling material taking up sufficient water to fill its pores or interstices, and retaining the same after the water has mainly evaporated from the emulsion, so that when, thereafter, the mixture is heated to melt the waterproofing material preparatory to molding it into a space between sections of concrete structure, or other locations to be waterproofed, there will be sufficient moisture absorbed in the filling material to volatilize and produce the effects referred to, as well as to bestow other advantages hereinafter recited; or the treatment to preserve inherent compressibility and resiliency of the filling material to consist in both the step of enveloping to exclude waterproofing material and impregnating with a volatile.

The present invention relates specifically to that one of the procedures enumerated in the above-mentioned application, Serial No. 700,734, which consists in saturating the pores or interstices of the fibrous, organic, or other equivalent filling material, previous to its incorporation into the water-proofing mass, with a volatilizable fluid having the capacity to resist entry of the solidifying waterproofing material into the pores or interstices of the filler, during the time or times when the waterproofing substance is in state of fusion, either as an incident to incorporating the filler therewith, or pouring the joint material into a mold or other defined space, for instance, the crack or space of the joint to be waterproofed; and according to which the volatilizable fluid taken up by the filling material is driven off during the fusion of the waterproofing mass, so that its function of excluding the waterproofing mass from the pores of the compressible filling material may result from the displacing action of escaping vapor in addition to the mere presence of the absorbed liquid in the pores or interstices of the filling material, and the escaping vapor may even add a physical characteristic to the waterproofing material itself which enhances its value by lending inherent compressibility and resiliency, mainly by developing cells or pockets through the mass from the escaping steam or vapor of the fluid. Water will ordinarily be used as the barrier to the entrance of the waterproofing material into the pores or interstices of the filler, and it will be employed, according to the specific procedure of the present invention, by soaking the fibrous organic material, which serves as the filler for the joint substance, in water, as a preliminary to incorporating the filler in the fused waterproofing substance.

The present invention consists in the several novel steps above outlined and hereinafter specifically described in an illustrative procedure, either singly or in such combinations as are hereinafter pointed out in the claims.

As a specific example of a procedure involving the subject-matter of the invention herein claimed, take one hundred pounds of asphalt or other bituminous material such as is approved by road engineers as an efficient sealing substance for the joints or cracks of molded cement pavement, for instance, the material known in commerce as "blown asphalt", and thoroughly incorporate therewith by stirring, while the mass is in a state of fusion, about five pounds of commercial excelsior which has been, previous to its incorporation into the mass, soaked in water for a time sufficient to approach substantial saturation but with excess water drained therefrom; continue the mixing operation until the originally waterlogged filler is thoroughly distributed through the mass of asphalt and as much longer as may be necessary to allow for complete vaporization of the water of absorption. In order to avoid absorption of fused asphalt after the water has been substantially displaced from the filler, the temperature of fusion should be kept as low as practicable, having in mind the boiling point of water and the work to be performed in stirring the asphaltic mass. A temperature of 215° F. has been found favorable for this purpose since it is ample to drive off the water and it does not reduce the asphalt to such a high state of fluidity as would result in an objectionable degree of penetration into the pores or interstices of the filler, if the procedure should be continued longer than necessary to drive off the water. The best method known to me of determining the duration of mixing is to test the resultant molded product for compressibility and resiliency; that is to say, the ratio of reduction of dimension of the mass in the direction of compression between two surfaces, without elongation in a direction transverse thereto, and from which compression the mass will slowly return to its original dimension.

In addition to impregnating the filler of subdivided material with a volatile that passes off under a temperature to which the waterproofing material can safely be subjected, the subdivisions of the filler may also be coated or jacketed with a substance that affords an additional safeguard against impregnation by the waterproofing material that would tend to solidify the filler, but such coating material would preferably be a substance that is soluble under the saturant of the filler. I have found that sodium silicate will serve well this purpose, being soluble in water but resistant to melted asphalt.

If the waterproofing joint mixture is to be used by melting and pouring in situ, as distinguished from use in a premolded form, it may be desirable to reduce the time of stirring when originally incorporating the filler in the asphaltic mass, and thereby leave entrapped in the filler such substantial portion of the water of saturation as will serve as a safeguard against penetration and destruction of compressibility and resiliency at the time the mass is re-melted for pouring into the joint; and in this aspect of the matter, the present invention contemplates an asphaltic or other waterproof joint-forming mass as an article of commerce, as well as the production thereof, when the incorporated filler of fibrous or other porous material retains some or all of its original protective saturant.

An important advantage of impregnating the porous fibrous material or other organic material with water, and then driving off the water by volatilization, arises from the fact that the steaming or volatilization puffs up or expands the volume of the organic filler, and thus makes it even more compressible and resilient than in its original state.

I claim:

1. A joint-forming composition of substantially the character described, composed of a waterproofing material and a filler of compressible material puffed or expanded within the mass of waterproofing material and unpenetrated thereby.

2. A joint-forming composition of substantially the character described, composed of a waterproofing material having incorporated therein a filler of compressible material in subdivided form, but free from impregnation by the waterproofing material.

3. A joint-forming composition of substantially the character described, composed of a waterproofing material having incorporated therein a filler of compressible material in subdivided form, but free from impregnation by the waterproofing material; the subdivisions of the filler being enveloped by the waterproofing material and being in puffed or expanded form.

4. A joint-forming composition, consisting of a fusible waterproofing substance having incorporated therein a filler of compressible material containing a volatile substance which vaporizes at a temperature of fusion of the waterproofing material.

5. A joint-forming composition, consisting of a fusible waterproofing material having incorporated therein a filler of compressible porous material which has been previously saturated with a displaceable volatile and jacketed with a substance which is resistant to the fused waterproofing material.

6. A joint-forming compound, consisting of fusible waterproofing material having incorporated therein compressible fibrous material in subdivided form and having its subdivisions impregnated with a material that is volatile under a temperature at which the waterproofing material fuses, and having said subdivisions jacketed with a material that is resistant to the fused waterproofing material, also enveloped in the waterproofing material.

7. The process of producing joint-forming material, which consists in incorporating in a fusible waterproofing material, a filler of subdivided compressible material containing a saturant which is volatile at a temperature at which the waterproofing material fuses for the purpose of preventing saturation of the filler by the fusible waterproofing material.

8. The process of producing joint-forming material, which consists in incorporating in a fusible waterproofing material, a filler of subdivided compressible material containing a saturant which is volatile at a temperature at which the waterproofing material fuses, and driving off said saturant from the filler by the application of heat to the mass, for the purpose of preventing appreciable penetration of the filler by the waterproofing material.

9. The process of producing packing joint material, which consists in incorporating in a mass of waterproof fusible material a filler consisting of subdivided absorbent and compressible material, containing a saturant which is volatile at a temperature at which the waterproofing material fuses, and the subdivisions of which said filler are jacketed by material which is resistant to the waterproofing material when in fused state.

10. The process of producing packing joint material, which consists in impregnating a compressible and absorbent filler in subdivided form with a volatile saturant, coating the subdivisions of said filler with a substance that resists further absorption, and incorporating the filler thus prepared in a mass of waterproofing material.

11. The process of producing packing joint material, which consists in impregnating a compressible and absorbent filler in subdivided form with a volatile saturant, coating the subdivisions of said filler with a substance that resists further absorption, and incorporating the filler thus prepared in a mass of waterproofing material which is fusible at a temperature which volatilizes the saturant.

12. The process of producing packing joint material, which consists in impregnating a compressible and absorbent filler in subdivided form with a volatile saturant, coating the subdivisions of the filler with a material that is soluble in the saturant but is resistant to further absorption by the filler.

13. The process of producing packing joint material, which consists in incorporating in fusible waterproofing material, a filler impregnated with a saturant that is volatile under a temperature at which the waterproofing material fuses, and subjecting the mass to a degree of heat which vaporizes the saturant from the filler, and in a manner to prevent appreciable penetration of the waterproofing material into the filler.

14. The process of preparing packing joint material, which consists in incorporating, in a mass of fusible waterproofing material, a filler in subdivided form, that has been previously impregnated with a saturant that is volatile at a temperature at which the waterproofing material fuses, and the subdivisions of which said filler have been coated with a substance that is soluble in the saturant, but is resistant to the waterproofing material.

15. The process of producing joint forming material which consists in incorporating in a fusible waterproofing material, a filler of subdivided compressible material containing a saturant which is volatile at temperatures at which the waterprofing material fuses, and subjecting the mass to heat of such a degree and for a period of time which will maintain the waterproofing material in a proper state of viscosity, and which will permit the vaporization of the saturant from the filler, whereby the impregnation of the filler by the waterproofing material is prevented.

Signed at Chicago, Illinois, this 30th day of October, 1925.

ALBERT C. FISCHER.